United States Patent [19]

Lombas et al.

[11] Patent Number: 5,580,450
[45] Date of Patent: Dec. 3, 1996

[54] APPARATUS FOR OIL SPILL RECOVERY

[75] Inventors: Leslie P. Lombas, Barataria; Daniel P. Pitre, Montegut, both of La.

[73] Assignee: Texaco, Inc., White Plains, N.Y.

[21] Appl. No.: 403,609

[22] Filed: Mar. 14, 1995

[51] Int. Cl.⁶ .................................................. E02B 15/04
[52] U.S. Cl. ........................................ 210/242.3; 210/923
[58] Field of Search ........................... 210/776, 242.3, 210/923, 540

[56] References Cited

U.S. PATENT DOCUMENTS

| | | | |
|---|---|---|---|
| 2,330,508 | 9/1943 | McColl | 210/923 |
| 2,608,300 | 8/1952 | Small | 210/242.3 |
| 3,348,690 | 10/1967 | Cornelison | 210/923 |
| 3,684,095 | 8/1972 | Ayers | 210/242.3 |
| 3,844,944 | 10/1974 | Mercuri | 210/776 |
| 3,847,816 | 11/1974 | Di Perma | 210/923 |
| 3,983,034 | 9/1976 | Wilson | 210/923 |
| 4,182,679 | 1/1980 | Van Hekle | 210/923 |
| 4,209,400 | 6/1980 | Mayes | 210/242.3 |
| 4,588,501 | 5/1986 | Jordan | 210/242.3 |

*Primary Examiner*—Christopher Upton
*Attorney, Agent, or Firm*—Kenneth R. Priem; Harold J. Delhommer; James L. Bailey

[57] ABSTRACT

An oil recovery skimmer assembly, mountable on any suitable barge like structure, has means for placing booms so as to direct water to at least one scoop assembly where surface water and oil is skimmed off and pumped to a separator tank where substantially all the oil is separated from the water and the water returned to within the boom area, thereby assuring retreatment of the water and non-return of oil to the environment.

3 Claims, 4 Drawing Sheets

APPARATUS FOR OIL SPILL RECOVERY

BACKGROUND OF THE INVENTION

1. The Field of the Invention

The present invention relates to a system for treating oil spills to both recover the oil and to process an area of oil contaminated water.

2. The Prior Art

The treatment of oil spills and, in particular, the recovery of oil spilled into open water areas has become an increasing source of concern. Heretofore there has been extensive use of shallow water skimming to help clean up after spills in lakes, streams, and rivers. It has been noticed by the inventor, while working on these inland spill sites, that the existing skimmers are not very effective in picking up the oil unless the oil is already contained inside of booms. Also these skimmers are fairly expensive to operate for short time periods.

An example of an ocean skimmer may be found in U.S. Pat. No. 4,136,008, the disclosure of which is incorporated herein by reference.

SUMMARY OF THE INVENTION

The present invention concerns an oil spill recovery system which is so constructed as to be readily available for dispatched to a spill site. The system does not require a dedicated barge but can be mounted on any available barge. The booms can be deployed to direct spill oil toward primary skimmers which feed the skimmed oil, and some water, to a secondary separation means. The treated water is returned inside the booms to assure no accidental contamination of the spill.

BRIEF DESCRIPTION OF THE DRAWINGS

The present invention will now be described, by way of example, with reference to the accompanying drawings in which.

A DETAILED DESCRIPTION OF THE PRESENT INVENTION

Figure 1:
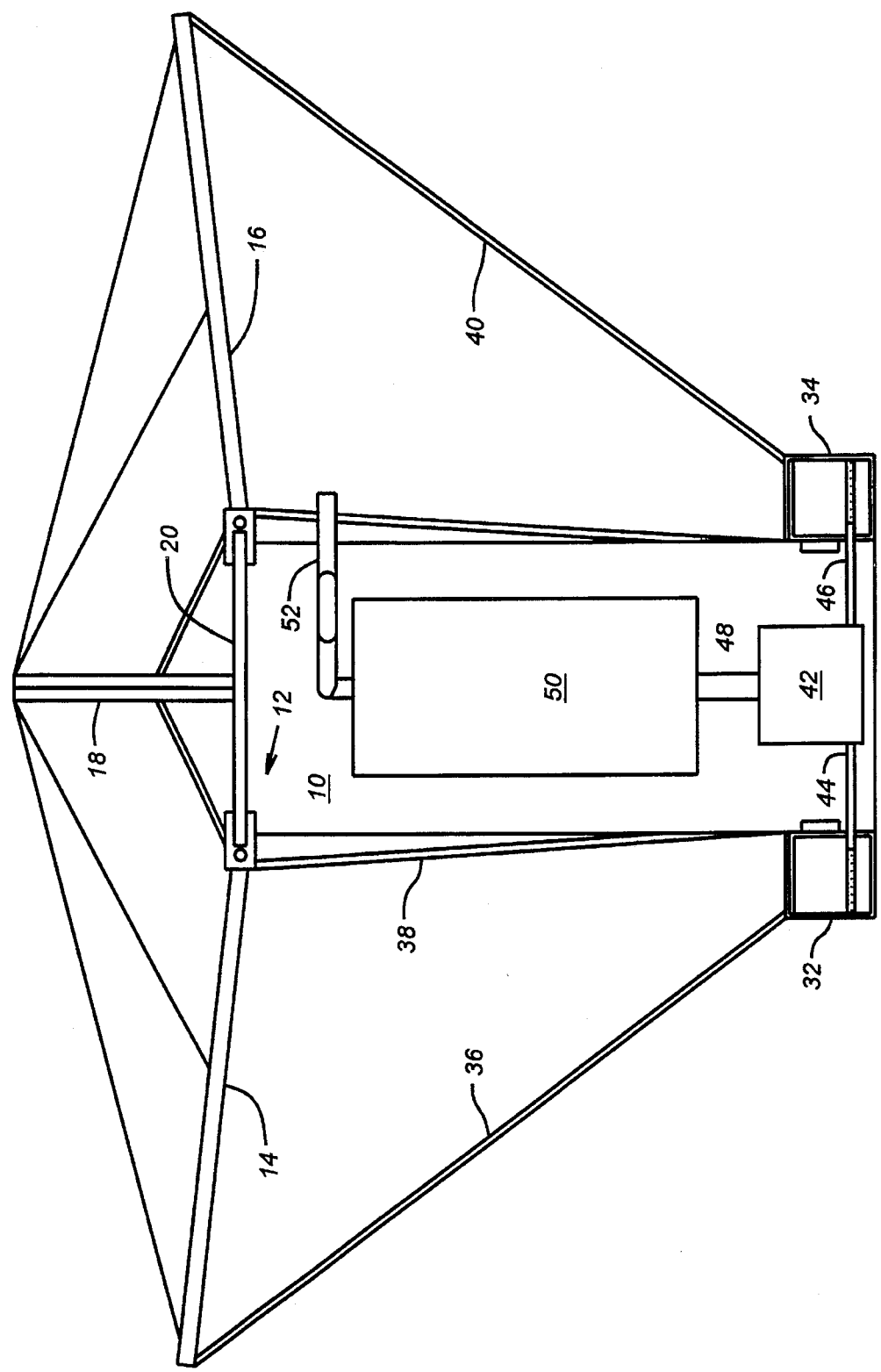
FIG. 1 is a top plan view of a barge equipped with the skimmer system of the present invention.

Turning now to FIG. 1, the subject invention is shown mounted on a conventional barge 10 which may be self-propelled, pushed or towed. The subject system has a boom suspension assembly 12 mounted on the bow portion of the barge 10 supporting port and starboard wing masts 14, 16 diverging from respective sides of the barge and a bow mast 18 extending forwardly from the barge. The masts are supported from a frame 20 by a plurality guy wires in conventional fashion. A plurality of downwardly directed boom mounting struts 22, 24, 26, 28, 30 extend from the respective masts to substantially below the water line. Port and starboard scoop assemblies 32, 34 are mounted on opposite sides of stern of the barge. The booms 36, 38, 40 form a roughly W-shaped configuration, with the wide portion opening toward the bow of the barge and the narrow feet opening to the scoop assemblies 32,34. Boom 36 is attached between strut 22 and scoop assembly 32. Boom 38 is attached from scoop assembly 32 to around struts 24, 26, and 28 at the bow of the barge and to scoop assembly 34. Boom 40 is attached between strut 30 and scoop assembly 34. Pump means 42, which can be a single pump or dual pumps, are mounted on the stern of the barge with suction pipes 44, 46 connected to the respective scoop assemblies 32, 34 and pipe 48 to a skimmer tank 50. A discharge line 52 has one end connected to the skimmer tank and the other end extending over the side of the barge.

The booms are preferable made out of flexible fluid tight material, such as plastic or tightly woven cloth. It should have sufficient tensile strength to withstand the forces developed as the barge moves through the water. It should also be resistant to puncture by floating debris. The booms should have sufficient width to extend well above and below the water line. Attachment of the booms to the struts and scoop assemblies can be by any conventional means.

Figure 2:
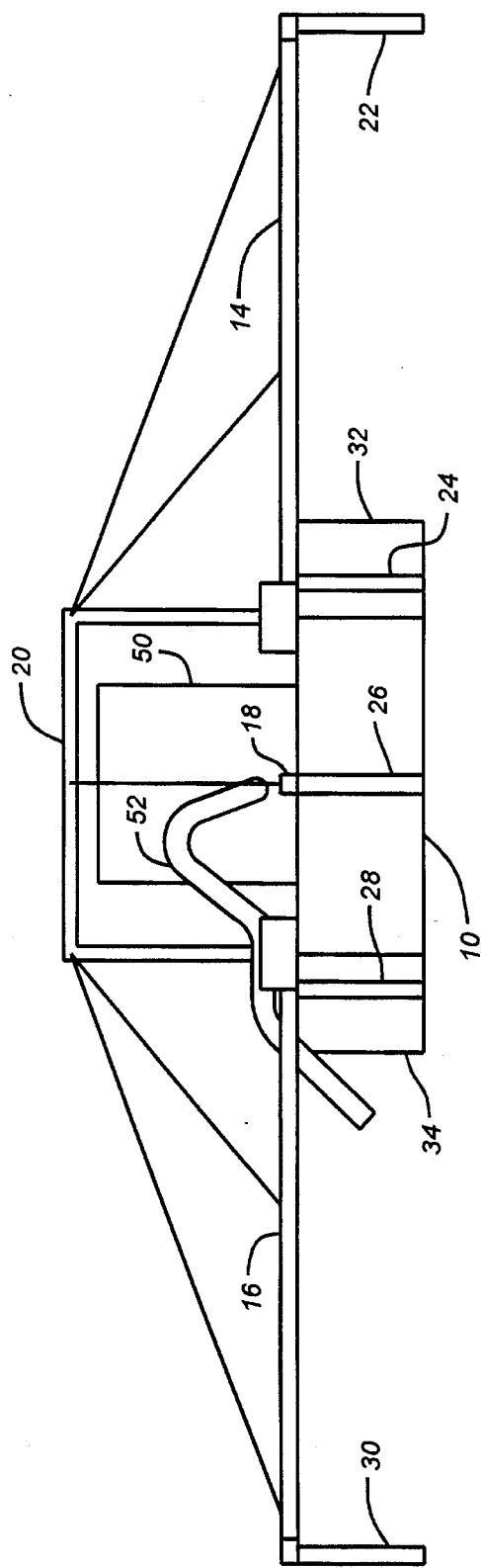
FIG. 2 is a side elevation of the barge of FIG. 1 with the booms removed.
Figure 3:
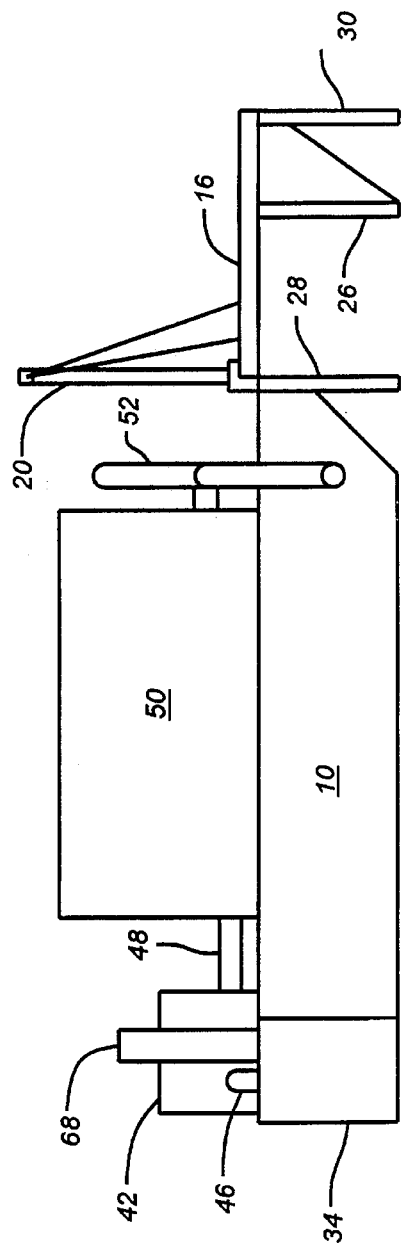
FIG. 3 is a front elevation of the barge of FIG. 1 with the booms removed.

Turning now to FIGS. 2 and 3, the boom suspension assembly 12 includes a generally rectangular frame 20 extending substantially normal to the deck and to the longitudinal axis of the barge 10. The bow mast 18 extends substantially normal to the bow of the barge and lateral masts 14, 16 extend outwardly and forwardly of the frame assembly 20. A plurality of guy lines support the frame 20 on the barge 10, and the masts 14, 16,18 from the frame assembly 12. It will readily appreciated that this arrangement facilitates the portability and deployment of the present invention. The subject system can be permanently mounted on a dedicated barge or kept in kit form for rapid deployment to the site of a spill for mounting on an available barge. It will also be appreciated that the masts 14, 16 are preferably pivotally mounted to the frame 20 and therefore are adjustable for the width of the boom opening. This feature allows the subject system to move into areas where similar apparatus will not fit, for example between bridge pilings.

Figure 4:
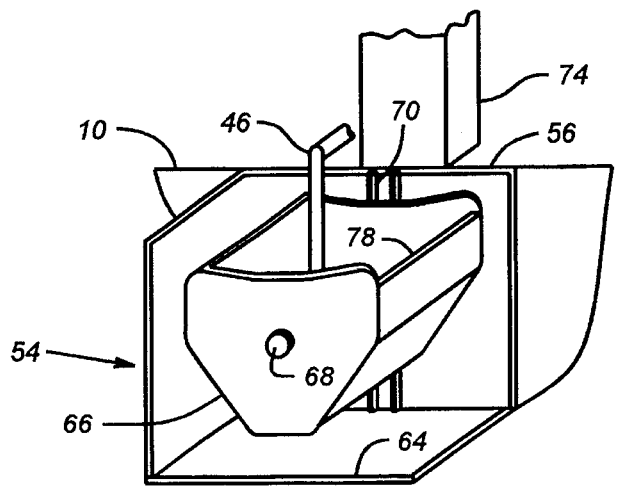
FIG. 4 is a detailed perspective view partially broken away and parts omitted for clarity, of an oil scoop portion of the present invention.
Figure 5:
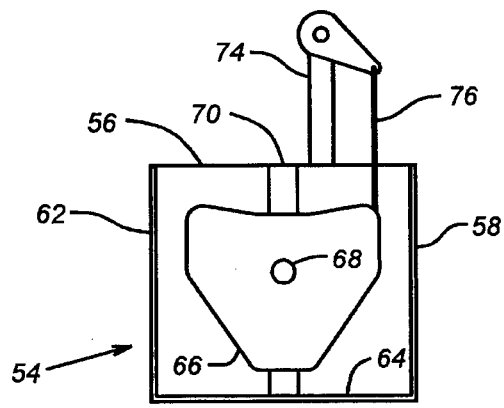
FIG. 5 is a side elevation of the oil scoop of FIG. 4.
Figure 6:
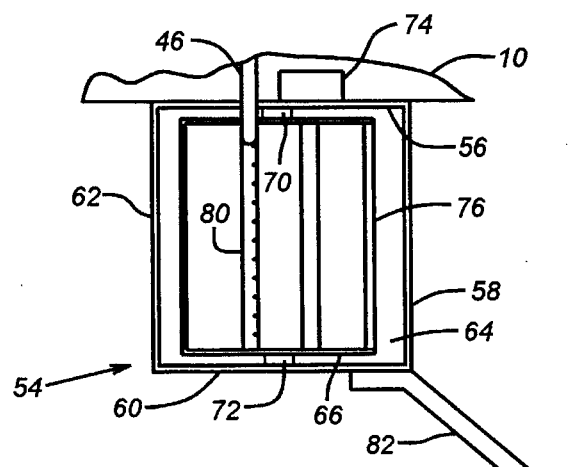
FIG. 6 is a top plan view of the oil scoop of the FIG. 4.

The starboard scoop assembly 34 is shown in more detail in FIGS. 4, 5, and 6. The two scoop assemblies 32, 34 are substantially mirror images. The scoop assembly 34 has an open topped generally rectangular water tight enclosure 54 formed by sidewalls 56, 58, 60, 62 and bottom 64 supporting therein an oil scoop bucket 66. The scoop bucket 66 is mounted within enclosure 54 for rotation about an axle 68 which is received in tracks 70, 72 for vertically positioning the bucket 66 by control means 74. The assembly also includes bucket tilt adjustment means 76 connected to the bucket 66 to rotate it around its axle 68 to position the weir lip 78 with respect to the water surface. A strainer assembly 80 is positioned in the bottom of the oil scoop bucket 66 and is connected by suction line 46 to the pump means 42. Sidewall 56 includes means (not shown) for mounting the scoop assembly 34 on the barge 10 and means (also not shown) along the forward edge for attachment of the boom 38. Sidewall 60 also has boom attachment means (not shown) along the leading edge and can be provided with an outwardly angled boom support plate 82.

Figure 7:
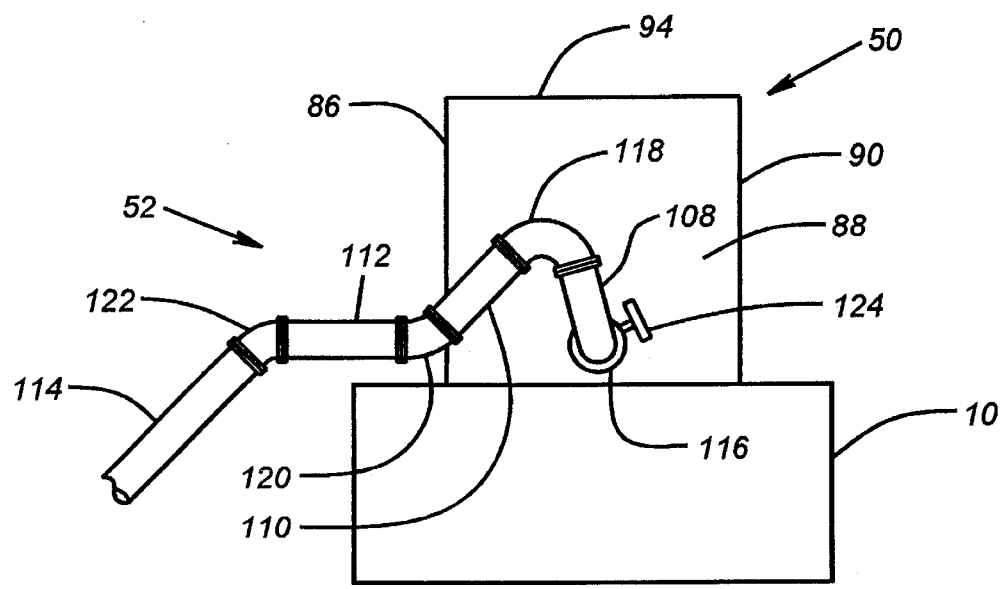
FIG. 7 is a front elevation of the skimmer tank and clean water discharge pipe.
Figure 8:
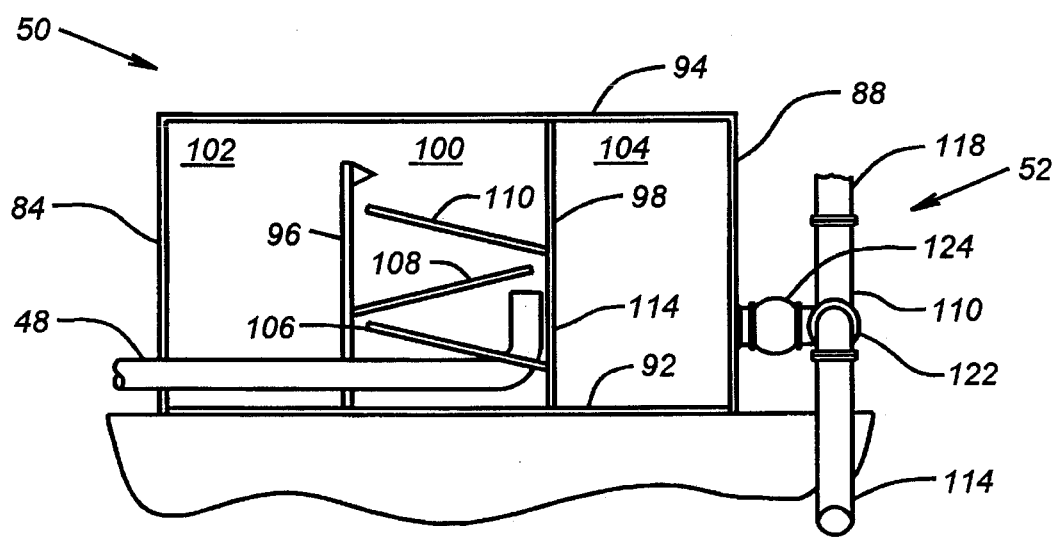
FIG. 8 is a side elevation, partially in section, of the skimmer tank.

The skimmer tank 50, see FIGS. 7 and 8, is a generally rectangular water tight vessel having sidewalls 84, 86, 88, 80, integral with bottom wall 92 and an openable cover 94. It is divided into three sections by transverse walls 96, 98, to form a central pump discharge section 100, an oil reservoir section 102 and water discharge section 104. The pump discharge section 100 is provided with a plurality of baffles 106, 108, 118 and the pump discharge pipe 48 extends into this section. A weir 112 is formed at the top of wall 96 between the pump discharge section 100 and the oil reservoir section 102. A port 114 connects the pump discharge section 100 to the water discharge section 104. The water discharge section 104 is provided with the adjustable discharge line 52 formed by outlet pipes 106, 108, 110, 112 and 114 which are joined in articulated fashion by flexible couplings 116, 118, 120, and 122. The discharge line 52 is also provided with valve 124.

The present invention is designed to be used with any type of a well known barge which can be either self propelled, towed or pushed as desired. The subject invention can be readily assembled and placed on a standard barge without requiring extensive modification thereof so that the invention is therefore very portable and could be rapidly dispatched to the site of a spill and put into operation on an available barge long before a dedicated barge could be moved from its home port to the spill site.

In operation, once the present invention has been mounted on the barge, the masts 14, 16 and 18 would be deployed and the booms 36, 38, 40 fastened in place with the upper and lower edges thereof extending well above and below the water line, respectively. The barge 10 would then be moved through the spill area with the wide open mouth of the booms gathering the contaminated water and directing it towards the scoop assemblies 32, 34. The scoop assemblies 32, 34 are designed so that the buckets 66 are positioned in the water, with the forward weir 78 at or just below the water line. The movement of the barge through the contaminated water will bring the water to the scoop assemblies where the oil floating on the surface, and a portion of the water, will flow into the respective scoop buckets 66. The pump means 42 will suck the oil and water out of the scoop buckets 66 and into the skimmer tank 50 where the baffles 106, 108, 110 in the pump discharge section 100 create turbulence facilitating separation of the oil and water. As the water and oil mixture fills the discharge section 100, the lighter oil will splash over the weir 112 and be contained in the oil reservoir section 102. The substantially oil free water will pass through port 114 into the valve discharge section 104. The valve 124 in the discharge line 52 is used to control the oil flow into the oil reservoir section 102. When a sufficient amount of oil has accumulated in the middle section 100, the operator shuts off the valve 124 causing the oil in the middle section 100 to rise over the baffle 96 separating the reservoir 102 and the discharge section 100. When the operator sees that the middle section is substantially free of oil the valve 124 is then opened and the water discharged return the tank to its normal operating level.

The positioning of the articulated discharge pipe 32 controls the level of the water in the water discharge section 104 and the setting of valve 105 controls the rate of discharge of the treated water overboard. It should be noted that the water being discharged is discharged inside of the booms thereby assuring that there will be no unintended discharge of contaminated water into the surrounding environment. Any oil remaining in the treated water would simply go through the cycle until captured.

The present invention may be subject to many modifications and changes without departing from the spirit or essential characteristics thereof. The present embodiment should therefore be considered in all respects as illustrative and not restrictive as to the scope of the present invention as defined by the appended claims.

We claim:

1. An oil skimmer barge for recovering oil particularly in shallow water areas comprising:

a boom suspension assembly having a bow mast and port and starboard wing masts each hingedly mounted on the sides near the bow of a barge, said bow mast extending forwardly of the bow said barge;

means for deploying said boom suspension assembly to define two funnel shaped scoops in a generally W shaped configuration for directing surface water and oil to a neck portion, said neck portion of each of said scoops being located near the stern of said barge;

a pair of scoop assemblies at said neck portions of each said scoops, each of said scoop assemblies having a scoop bucket carried by a water tight frame open at the top and said scoop bucket's position being adjustable in said frame;

a pair of pumps connected to said scoop buckets to pump oil and water from said scoop buckets to a skimmer tank having a plurality of compartments at least one of which is connected to receive discharge from said pumps;

means for discharging separated water from said tank to said scoops whereby oil and water skimmer by said scoops from the surface of the water into said scoop buckets, pumped to the skimmer tank where the oil is largely separated from the water, and the water returned inside the scoops sot hat residual oil will be retreated.

2. A skimmer assembly according to claim 1 and further comprising frame and guying apparatus for suspending said port and starboard wing masts forwardly and laterally of said barge.

3. The apparatus according to claim 1 wherein each said scoop assembly comprises a frame having therein a scoop bucket mounted for both vertical positioning within the frame and rotational movement said frame whereby a lip portion of said bucket can be positioned with respect to the water oil interface.

* * * * *